Patented July 7, 1931

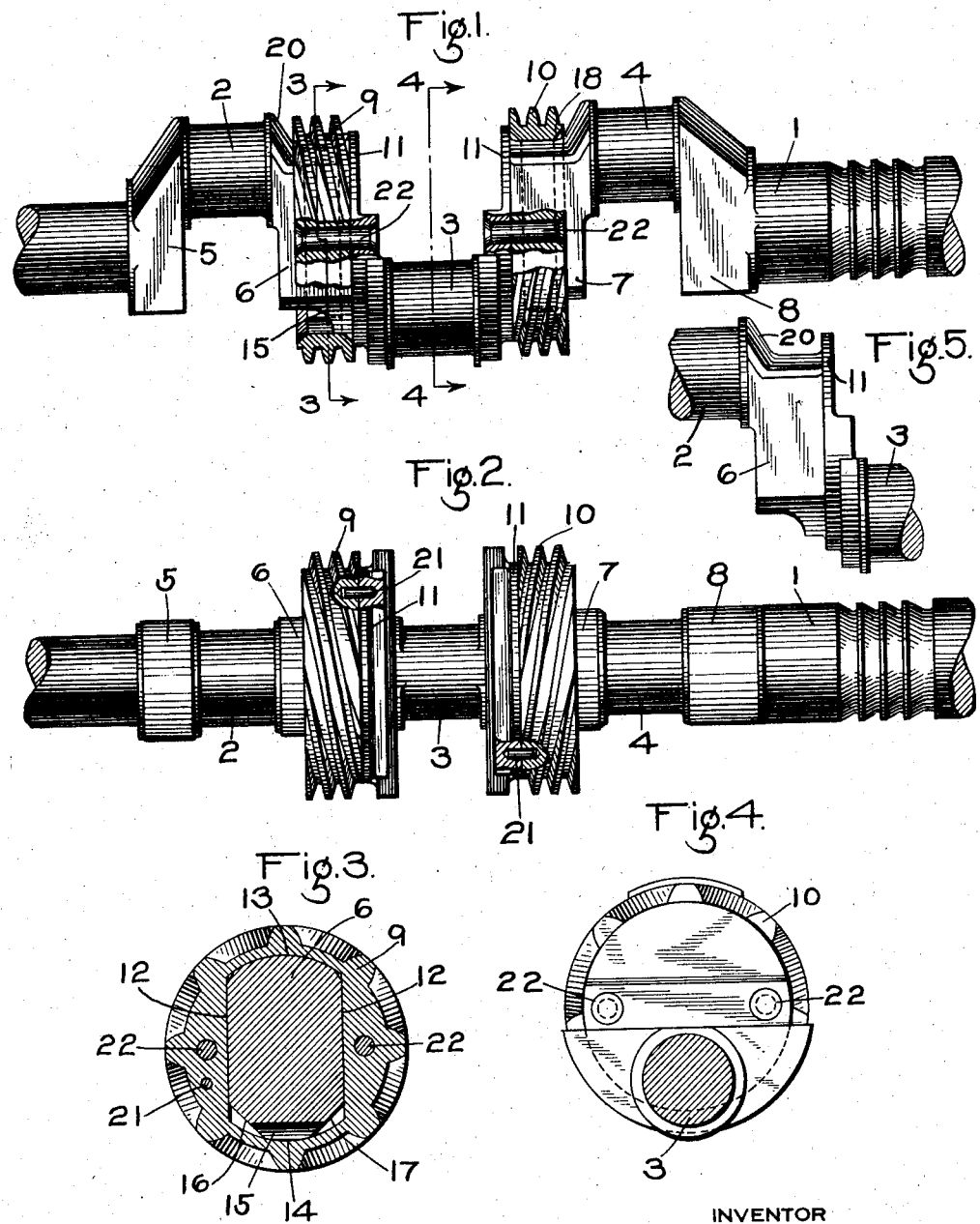

1,813,153

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

CRANK SHAFT

Application filed December 27, 1929. Serial No. 416,871.

This invention relates to crank shafts, and more particularly to a crank shaft having gears associated therewith.

In some cases, gears are associated with crank shafts, as in the case of certain types of fluid compressors, in which the fluid controlling valve mechanism is operated by gears on the crank shaft.

Such gears must be accurately cut and positioned, and this is rendered difficult, if the gears are formed integral with the crank shaft. On the other hand, it is difficult to apply gears to a crank shaft, so that the gears will be accurately positioned, and it is difficult to so construct the gears that they may be readily applied to the crank shaft and firmly secured in position.

The principal object of my invention is to provide an improved geared crank shaft in which the above difficulties are overcome.

In the accompanying drawings; Fig. 1 is an elevational view, in one plane, of a geared crank shaft embodying my invention; Fig. 2 an elevational view of the crank shaft in a plane at right angles to that of Fig. 1; Fig. 3 a section on the line 3—3 of Fig. 1; Fig. 4 a section on the line 4—4 of Fig. 1 and Fig. 5 a detail view of the crank arm.

The crank shaft 1, as shown in the drawings, is adapted for a three cylinder fluid compressor (not shown) and has three connecting rod bearing pins 2, 3, and 4. The bearing pin 2 is carried by crank arms 5 and 6, the bearing pin 3 by arms 6 and 7, and the bearing pin 4 by arms 7 and 8.

The crank arms 6 and 7 are adapted to carry gears 9 and 10 respectively and each crank arm is provided adjacent to the pin 3 with an integral flange 11. Each arm is formed adjacent to the flange with machined flat parallel sides 12 and arcuate ends 13 and 14, concentric with the main shaft of the crank shaft.

Each gear is provided with an opening adapted to snugly fit over the crank arm section above described and the crank arm section is cut away as shown at 15 and also at 16 and 17 to facilitate the assembly of the gear on the shaft. Each gear is also chamfered as shown at 18.

In assembling, the gear 9 is threaded over the crank arm 5, which arm is of a size and contour to permit same to pass through the opening in the gear. The gear is then threaded over the crank arm 6, the chamfer 18 facilitating the movement, with respect to the inclined portion 20 of the crank arm. The gear is cocked with the lower portion held toward the left, as it is brought into engagement with the flange 11, so that the lower arcuate end of the opening in the gear will clear the lower arcuate portion 14. The gear is then swung toward the right at its lower end, so that the gear engages the flange 11, as shown in Fig. 1. A dowel pin 21 extends into bores formed in the gear and in the crank arm, for the purpose of accurately alining the gear and preventing the gear from being positioned on the shaft in an incorrect manner.

Rivets 22 are then inserted in alined bores in the gear and the crank arm and are riveted down, so as to firmly secure the gear in place. The gear 10 is applied in position in the same manner as the gear 9.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A crank shaft having a crank arm, a section of which has a contour including parallel sides, a gear mounted on said section having an opening, the contour of which corresponds with the contour of said section, a flange formed at one side of said section against which the gear bears, and means for securing said gear in position on said section.

2. A crank shaft having a crank arm, a section of which has a contour including parallel sides and arcuate ends, a gear mounted on said section having an opening, the contour of which corresponds with the contour of said section, one of the arcuate ends being cut away laterally and longitudinally to facilitate the assembly of the gear on the section, and means for securing the gear in position on the section.

In testimony whereof I have hereunto set my hand this 23rd day of December, 1929.

CLYDE C. FARMER.